United States Patent [19]

Suga

[11] Patent Number: 5,367,859
[45] Date of Patent: Nov. 29, 1994

[54] PACKAGING APPARATUS

[75] Inventor: Yasutaka Suga, Ibaraki, Japan

[73] Assignee: Ibaraki Seiki Machinery Company, Ltd., Osaka, Japan

[21] Appl. No.: 88,042

[22] Filed: Jul. 6, 1993

[51] Int. Cl.⁵ .......................... B65B 9/08; B65B 51/30
[52] U.S. Cl. ...................................... 53/550; 53/374.6
[58] Field of Search ...................... 53/374.5, 374.6, 550

[56] References Cited

U.S. PATENT DOCUMENTS

| | | | |
|---|---|---|---|
| 2,951,325 | 9/1960 | Podlesak et al. | 53/374.6 |
| 3,237,371 | 3/1966 | Gerlach | 53/374.6 |
| 3,438,173 | 4/1969 | Omori | 53/374.6 X |
| 5,269,119 | 12/1993 | Tolson | 53/374.5 |
| 5,271,210 | 12/1993 | Tolson | 53/374.5 X |
| 5,285,621 | 2/1994 | Ballestrazzi et al. | 53/374.6 X |

FOREIGN PATENT DOCUMENTS 2153328  8/1985  United Kingdom .

*Primary Examiner*—Horace M. Culver
*Attorney, Agent, or Firm*—Barnes, Kisselle, Raisch, Choate, Whittemore & Hulbert

[57] ABSTRACT

An improved packaging apparatus comprising; a pair of endless belts 70 and 70 which respectively nip a tubular film 63 at a downstream domain of a frame body 14 which is capable of reciprocating itself in order to support a pair of sealing bars 65 and 66 for sealing a tubular film 63 used for covering a number of packageable individual contents 46 being conveyed in file; two pairs of pulleys 73 and 74 which respectively support a pair of belts 70 secured to a supporting plate 71 connected to the frame body 14; and a pair of bevel gears 80 and 80 which link an idle shaft 79 having own axis horizontally being secured to the supporting plate 71 by means of a pair of shafts of those pulleys 73 and 74 engaged with a pair of endless belts 70 and 70. An endless chain 86 links a chain wheel 86 secured to the idle shaft 79, a pair of chain wheels 84 and 85 secured to the frame body 14, and a pair of chain wheels 82 and 83 secured to the frame body 14, with each other. By properly selecting the number of the rotation of a drive chain wheel 83 which transmits drive force to the endless chain 86, speed of the rotation of those endless belts 70 and 70 during the proceeding operation of the frame body 14 can be reduced to zero against the speed of the proceeding movement of the frame body 14.

2 Claims, 8 Drawing Sheets

PACKAGING APPARATUS

FIELD OF THE INVENTION

The present invention relates to a tubular-film-loading type packaging apparatus characterized by functional capability to sequentially execute a step to convert a belt-form continuous film being shifted in the longitudinal direction into tubular form with a tubulating means like a former for example, a step to load a number of packageable individual products in the tubular film at equal intervals by operating a conveyer, and a final step to seal up the tubular film between individual contents.

BACKGROUND OF THE INVENTION

For instance, the BP2,153,328 discloses such a packaging apparatus in its proper specification and accompanying drawings, which features the structure capable of executing those steps including the following; a step to convey a number of tray-form containers each containing food product aligned in file at predetermined intervals; a step to tubulate a belt-form thermoplastic film being conveyed at a speed identical to that of those containers in the periphery of each container; a step to carry forward these containers and the tubular film further to the downstream side via rotation of a pair of side belts nipping each container from both sides; and a final step to cut off the tubular film between each container with a cutting means. Furthermore, the packaging apparatus disclosed in the above-identified BP2,153,328 pulls both ends of the cutoff tubular film in order to superpose the both ends by folding them onto the bottom surface of each container. After completing these steps, the film generates tension and promotes transparent look. This in turn favorably leads consumers to visually sense that food in each container is by far the fresh than normally being felt.

Nevertheless, since those food-containing packages internally contain substantial volume of air, food sealed in those packages is apt to rot as time goes by. Therefore, in order to prevent this, the above-identified BP2,153,328 proposes such a technique described below. A slender tubular nozzle with one-end being linked with a vaccum pump is inserted in a tubular film previously being tubulated by a tubulating means and conveyed in the longitudinal direction so that air remaining in each container and the tubular film can be eliminated therefrom. In this case, capability to fully seal both ends of the tubular film is extremely important. To satisfy this need, it is essential that a box-motion type sealing means be introduced. This sealing means reciprocates a pair of vertically disposed sealing bars in the longitudinal direction of the tubular film. When these sealing bars shift themselves in the direction identical to that of the tubular film, these sealing bars continuously transmit heat to the tubular film to melt it. However, when vacuum absorptive force transmitted via the tubular nozzle acts upon the interor of the tubular film, the tubular film contracts itself in the direction opposite from the shiting direction. As a result, those sealing bars cannot fuse appropriate position of the tubular film. Furthermore, because of the reciprocating movement of these sealing bars, clearance between these sealing bars and the downstream end of a pair of side belts nipping each container from both sides is variable, and therefore, each food container cannot properly be shifted to those sealing bars.

DISCLOSURE OF THE INVENTION

Therefore, the object of the invention is to provide an improved packaging apparatus capable of securely minimizing contractible amount of tubular film even when vacuum absorptive force transmitted via a tubular nozzle inserted in this tubular film acts upon the interior thereof, and yet, capable of securely sealing the tubular film crosswise between packageable individual contents.

To achieve the above object, the improved packaging apparatus according to the invention characteristically comprises the following; a frame body which reciprocates itself in the longitudinal direction of the tubular film on the halfway of a track used for conveying the tubular film in the longitudinal direction, wherein the tubular film itself covers packageable individual contents aligned in file at equal intervals; a pair of sealing bars which are secured to the frame body in order to seal up the nipped tubular film between packageable individual contents; a pair of belts which are discretely installed to a frame unit connected to the frame body at the downstream domain of the tubular film along the frame body via a pair of pulleys in order to nip the tubular film and the packageable individual contents from both sides; an idle shaft which is secured to the frame unit in order that it can rotate itself in the direction of conveying the tubular film and transmit drive force to those two pulleys via a group of gears; and a means for transmitting drive force to the idle shaft in order that the moving speed of those two belts mentioned above can be reduced to zero against the moving speed of the frame body while this frame body proceeds in the direction of conveying the tubular film, whereas those two discrete belts mentioned above can maintain own moving speed identical to that of the frame body while the frame body shifts itself in the backward direction.

The improved packaging apparatus according to the invention sets a pair of endless belts to a supporting frame secured to the downstream end of a frame unit which supports a pair of sealing bars. In order to transmit drive force to those two discrete belts mentioned above, an endless chain is engaged with a chain wheel of an idle shaft which is horizontally secured to the supporting plate mentioned above, a pair of chain wheels being set to the frame unit, and a pair of chain wheels being set to the fromt and rear domains of the frame body. In association with displacement of the frame body, these three chain wheels integrally displace themselves in conjunction with this frame body. In consequence, the endless chain is drawn in the backward direction in association with the forward movement of the frame body, and conversely, the endless chain moves forward while the frame body retreats. While the frame body proceeds, a specific amount of drive force is transmitted to the endless chain in order that the speed of the rotation of the endless chain can be reduced to zero against the proceeding speed of the frame body. Therefore, while the frame body retreats, the endless belt rotates itself at a speed that doubles the proper speed thereof. In consequence, even though the frame body proceeds or retreats itself, a pair of endless belts continuously exert tensile force against the tubular film while rotating themselves at a constant speed.

According to an aspect of a preferred embodiment of the invention, the improved packaging apparatus offered by the invention further comprises a pair of endless side belts which conjunctionally nip the tubular film from both sides of the upstream domain of the frame body. One ends of these two side belts in the upstream domain are respectively engaged with a pair of stationary first pulleys which are rotatably installed to the base of the packaging apparatus. The other ends of of these two side belts in the downstream domain are respectively engaged via a pair of bearing brackets with a pair of movable second pulleys installed to a frame unit which supports a pair of sealing bars used for cross-sealing the tubular film, where these two movable pulleys respectively proceed and retreat themselves in a predetermined range in the direction of conveying the tubular film. Furthermore, a pair of tension rolls are installed to tip domains of a pair of guide bars having one ends being secured to the above-referred two units of bearing brackets and the other ends slidably being set to the base. Slack domains of these side belts engaged with the first and second pulleys are respectively coupled with a pair of drive pulleys installed in the neighborhood of the second pulleys in the state of making a U-turn movement around those two tension rolls.

Since one ends of these side belts in the upstream domain are respectively held by those first pulleys installed to the base of the apparatus, independent of the proceeding and retreating movements of the frame body supporting those two sealing bars, one ends of those side belts in the upstream domain remain stationary at predetermined positions. Conversely, since the other ends of these side belts in the downstream domain are respectively held by the second pulleys which are installed to the frame body via a pair of bearing brackets, the other end domains respectively displace in association with the proceeding and retreating movements of the frame body. A pair of tension rolls are secured to a pair of guide bars each having an end being secured to each bearing bracket supporting each of a pair of stationary first pulleys, where these tension rolls integrally displace themselves in conjunction with the corresponding guide bars in association with the proceeding and retreating movements of the frame body. Concretely, a pair of movable second pulleys displace themselves synchronous with displacement of a pair of tension rolls in association with the proceeding and retreating movements of the frame body. Therefore, slack domains of those side belts engaged with the drive pulley by way of making a U-turn movement around those two tension rolls constantly maintain tense condition as a result of synchronous displacement effected by those two movable second pulleys, thus causing the whole length of each of these two side belts to properly elongate or contract in correspondence with the proceeding and retreating movements of the frame body. This in turn permits a pair of side belts respectively receiving drive force from the drive pulley to rotate themselves at a constant speed. By virtue of the above mechanical arrangement, the packaging apparatus can smoothly deliver packageable individual contents nipped between both sides of these side belts to a pair of box-motion type sealing bars in conjunction and integration with the tubular film, The above and further objects and features of the invention will more fully be understood from the detailed description and the accompanying drawings that follow.

Figure 6:
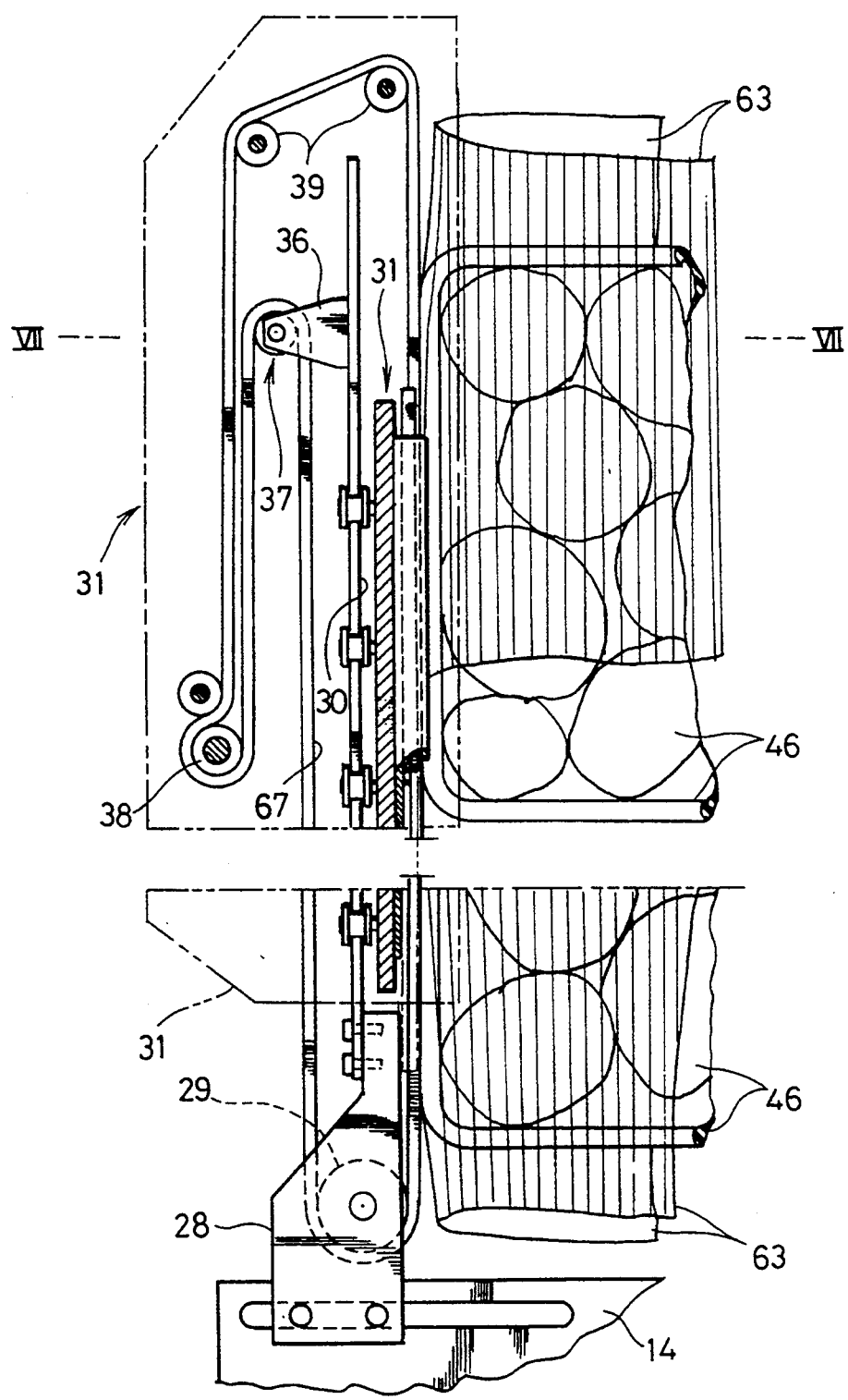
Figure 7:
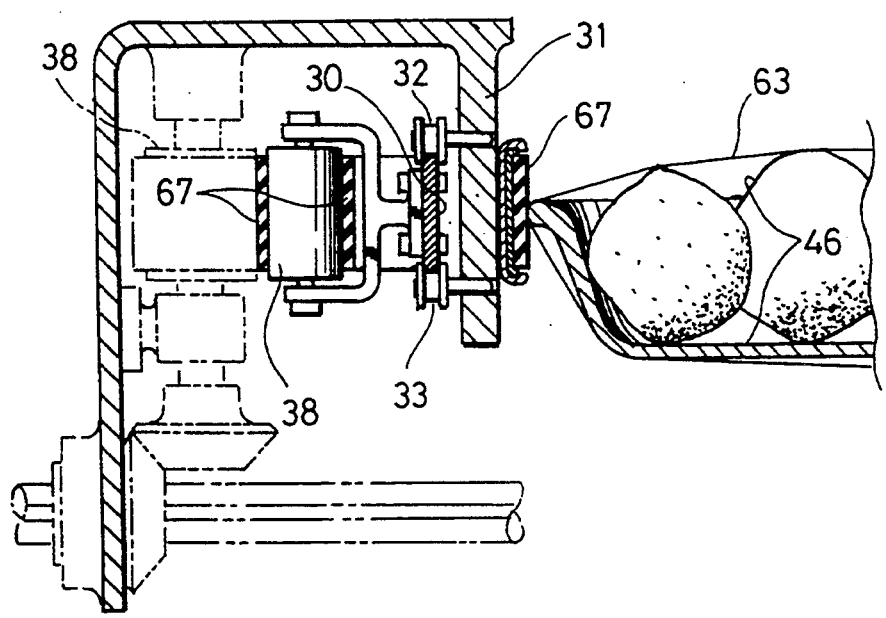
Figure 8:
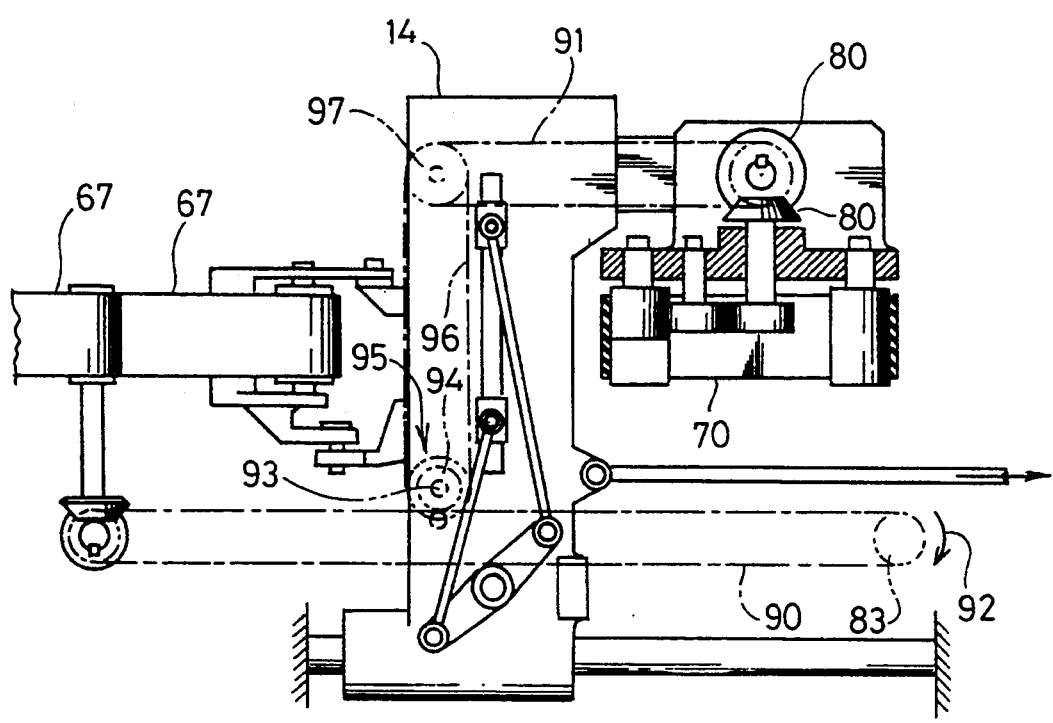

FIG, 5 is a detailed lateral view of the link mechanism between the frame body of the film-sealing mechanism and a pair of side belts provided therefor;

FIG. 6 is a plan of a single side of a pair of side belts installed on both sides;

FIG. 7 is a sectional view of the film-sealing mechanism across life VII through VII shown in FIG. 6; and FIG. 8 is a lateral view of a varied example of the film-sealing mechanism of the packaging apparatus according to another embodiment of the invention.

DESCRIPTION OF THE PREFERRED EMBODIMENTS

Figure 1:
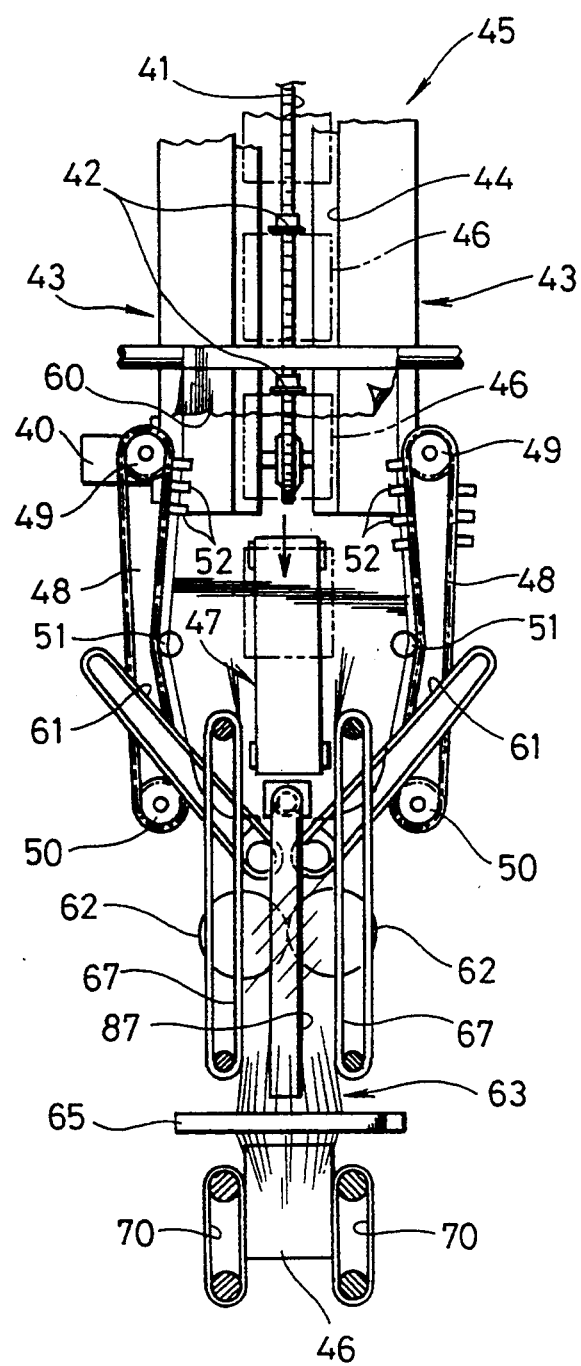
FIG. 1 is an overall plan of the packaging apparatus according to an embodiment of the invention.
Figure 2:
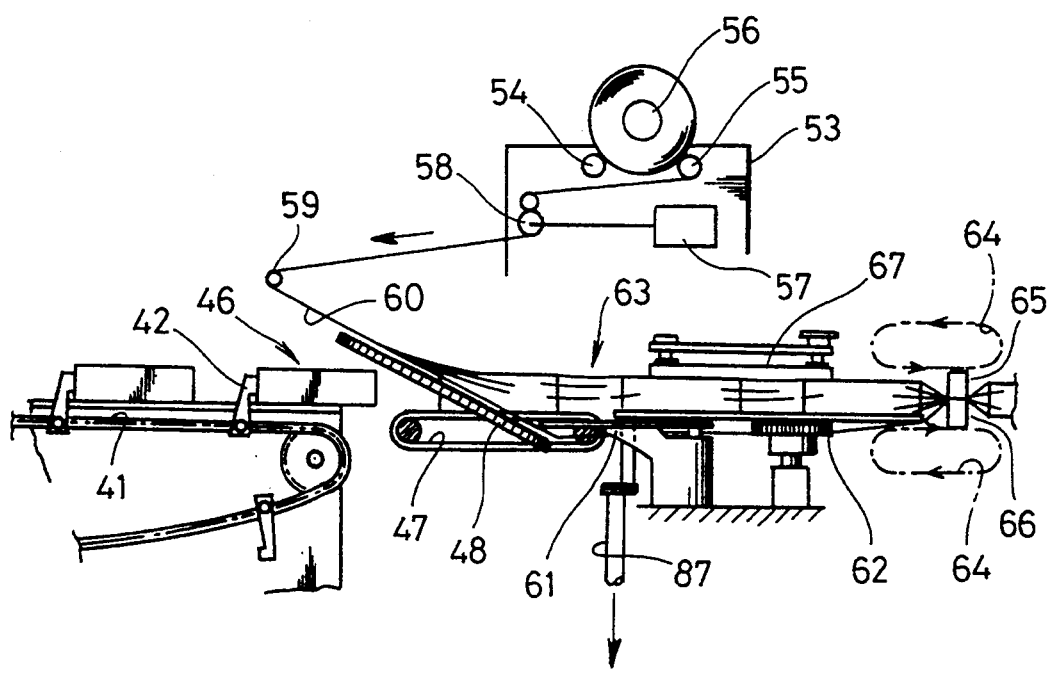
FIG. 2 is an overall lateral view of the packaging apparatus shown in FIG. 1.

FIG. 1 schematically illustrates an overall plan of the packaging apparatus according to an embodiment of the invention, in which a number of attachments 42 are secured to an endless chain 41 at equal intervals, where the endless chain 41 is rotated at a predetermined speed based on drive force generated by a motor 40. A supply conveyer 45 is provided by forming groove 44 in the center of the top surfaces of a pair of frames 43 which are erected on both sides of the endless chain 41. The supply conveyer 45 conveys packageable individual contents 46 which are pushed forward by individual attachments 42 onto a following conveyer 47 on the downstream side of the supply conveyer 45 as indicated by an arrowed line by internally sliding those individual contents 46 through the groove 46. A pair of side chains 48 are installed on both sides of the following conveyer 47, which are respectively engaged with a pair of chain wheels 49 and 50 and a pair of tension wheels 51. As shown in FIG. 2, these two side chains 48 are respectively furnished with a number of clampers 52 (shown in FIG. 1) at equal intervals. As is normally performed by conventional document clips, these clampers 52 respectively exert clamping force generated by resilient effect of ordinary springs. Only such a domain in contact with a circular cam (not shown) installed to a pair of chain wheels 49 and 50 is open to eliminate clamping force. Refer now to FIG. 2. A rolled film 56 is mounted on a pair of bar rollers 54 and 55 which are rotatably installed to the base 53. The rolled film 56 is led into clearance between a pair of side chains 48 and 48 via a direction-shifting roller 59 by means of a roller 58 which directly receives rotating force from a motor 57. Then, a belt-form film 60 is conveyed in the downward slant direction availing of the rotating force of a pair of side chains 48 and 48 in the state being nipped by those clampers 52. Since the clearance between both-side chains 48 and 48 expands at those domains being in contact with a pair of tension rolls 51 and 51 which are disposed on the halfway of both-side chains 48 and 48, the belt-form film 60 covers packageable individual contents 46 placed on the conveyer 47 in the state of exerting tension between both edges thereof. Edges on both sides of the belt-form film 60 are then disengaged from those clampers 52 at a position between a pair of downstream-side chain wheels 50 and 50, and then, edges on both sides of the belt-form film 60 are drawn to the center domain by effect of the rotation of a pair of cord-like belts 61 and 61 being disposed by way of forming V-shape, and finally, both edges of the belt-form film 60 is fused together in the form of clasped hands by effect of nipping force exerted by a pair of thermal rolls 62. In consequence, a number of packageable contents 46 are properly packaged in a tubular film 63 at equal intervals. A pair of sealing bars 65 and 65 respectively shift themselves while drawing a box-motion track in the arrowed direction as shown in FIG. 2. These sealing bars 65 and 66 conjunctionally fuse the tubular film 63 in predetermined space between packageable individual contents 46 being conveyed under auxiliary movement of a pair of side belts 67 and 67 on both sides.

Figure 3:
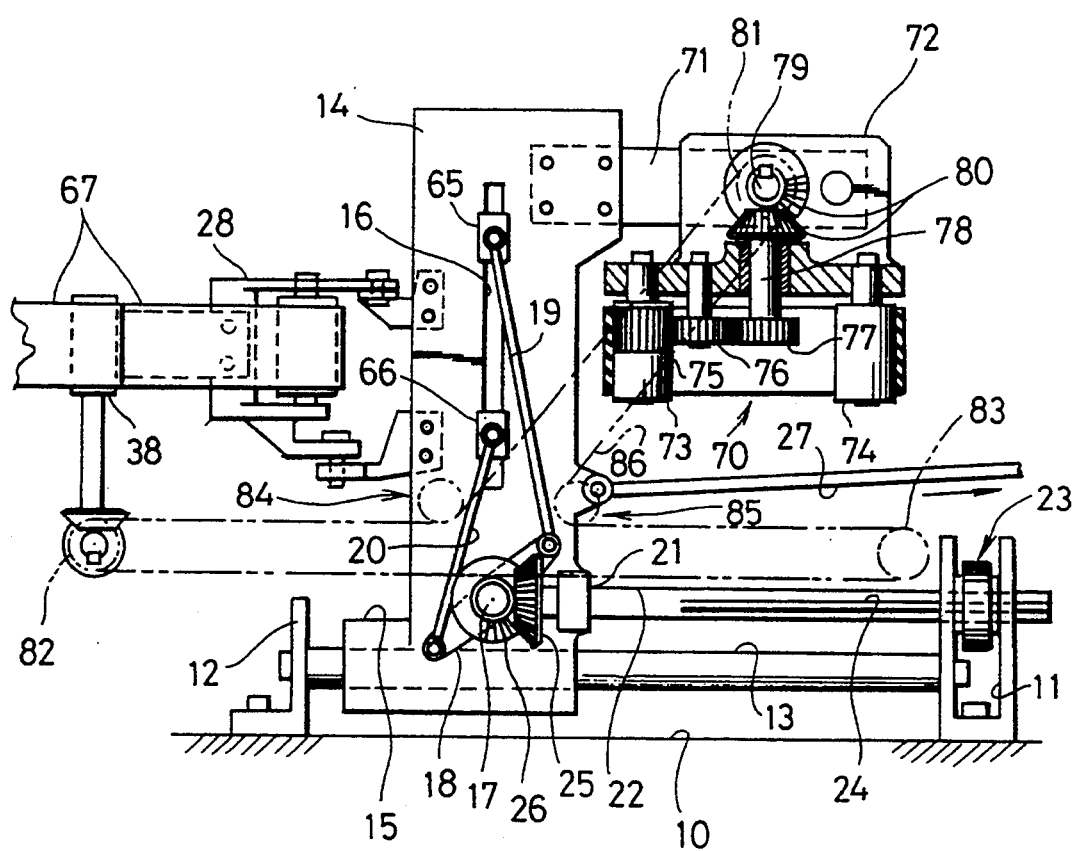
FIG. 3 is an enlarged and partially sectioned lateral view of the film-sealing mechanism provided for the packaging apparatus related to the invention.

FIG. 3 diagramatically illustrates the lateral view of the mechanism shown in FIG. 2 provided for operating a pair of sealing bars 65 and 66 vertically being disposed by way of following up a pair of box-motion type tracks 64 and 64. Concretely, a round-bar guide member 13 is secured between a pair of supporting members 11 and 12 which are stoutly erected on the surface of the base 10. A boss 15 below a frame body 14 is slidably installed to the round-bar guide member 13. Both ends of those sealing bars 65 and 66 are respectively coupled with a slit guide member 16 installed in the frame body 14 in the upright state in order that these sealing bars 65 and 66 can slidably move themselves in the vertical direction. Although FIG. 3 merely illustrates a single side of the frame body 14, there is another frame body 14 having the identical structure behind the illustrated frame body 14 in order to have both frame bodies 14 properly support both ends of a pair of sealing bars 65 and 66. A lever 18 is secured to an inverting shaft 17 having both ends respectively being supported by those two frame bodies 14. Both ends of the lever 18 are respectively linked with those sealing bars 65 66 via a pair of links 19 and 20. An end of an intermediate shaft 22 is secured to a bearing 21 of each frame body 14, whereas the other end of the intermediate shaft 22 is engaged with a center hole of a gear 23 which is secured to the supporting member 11 via a sliding key 24. An end of the intermediate shaft 22 is linked with the inverting shaft 17 via a pair of bevel gears 25 and 26. When the movement of a crank mechanism (not shown) is transmitted to those frame bodies 14 via a rod 27, the intermediate shaft 22 slides itself in the axial direction through the interior of the center hole of the gear 23 to cause those frame bodies 14 to reciprocate themselves along the round-bar guide member 13. When reverse movement is transmitted to the gear 23, this movement is transmitted to the intermediate shaft 22 being engaged with the gear 23 via the sliding key 24, thus causing a pair of sealing bars 65 and 66 to close on or depart from each other by effect of inverting operation of the lever 18. In consequence, a pair of sealing bars 65 and 66 can respectively perform such a movement by way of drawing a box-motion track 6.4 shown in FIG. 2. However, the tubular film 63 is merely sealed in a specific domain exactly matching the direction of the movement for carrying the film 63 forward despite of those movements described above, and in consequence, the tubular film 63 is ultimately cross-sealed at equal intervals.

Figure 4:
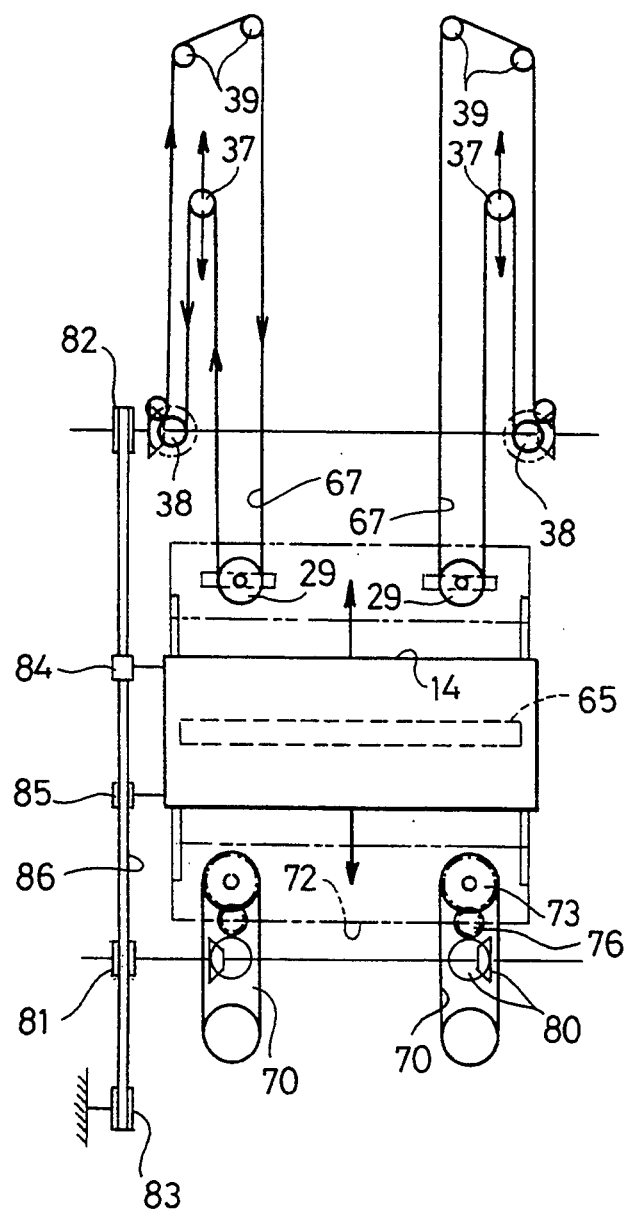
FIG. 4 is a diagramatic plan of the film-sealing mechanism and a pair of conveyer belts installed in the front and on the back of the film-sealing mechanism.
Figure 5:
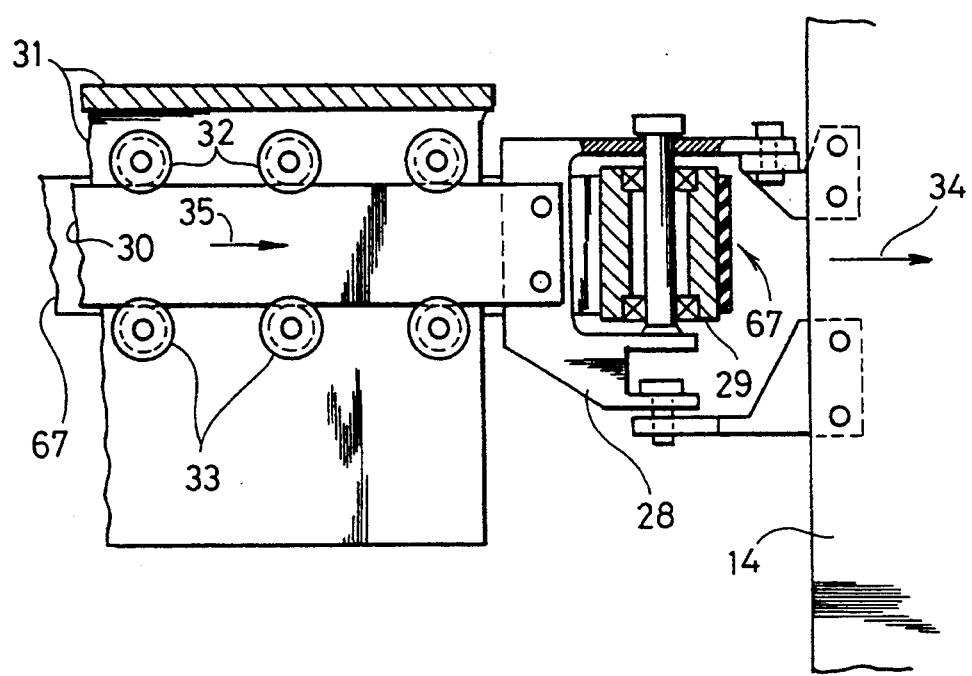

FIG. 1 simply illustrates a pair of side befits 67 and and 67. However, each of these side belts 67 has such a structural feature shown in FIGS. 4 through 6. Concretely, as shown in FIG. 5, each of these side belts 67 is wound on a pulley 29 which is secured to a bearing member 28 on the downstream side of each side belt 67. The bearing member 28 is secured to a frame body 14 which supports a pair of sealing bars 65 and 66. A slide plate 30 having one end being secured to the bearing member 28 is installed between a number of rollers 32 and 33 which are aligned in double ranks in the upper and lower positions along the lateral surface of a frame unit 31. Since the frame unit 31 is stationary in position, when the frame body 14 proceeds in the arrowed direction, the slide plate 30 also shifts itself in the arrowed direction 35 between a number of rollers 32 and 33 aligned in double ranks. As shown in FIG. 6, each of those side belts 67 and 67 is engaged with a movable pulley 37 which is secured to the slide plate 30 via a bearing 36. On the other hand, a drive pulley 38 and a plurality of idle pulleys 39 are immovably secured to the frame unit 31. Therefore, when the drive pulley 38 transmits drive force to rotate those side belts 67 and 67, only a pair of pulleys 29 and 37 can follow the shifting movement of the frame body 14, and thus, as shown in FIG. 4, these side belts 67 and 67 can elongate or contract themselves in correspondence with reciprocating movement of the sealing bar 65. Because of this, clearance between the sealing bar 65 and the pulley 29 supporting one ends of those side belts 67 and 67 at the downstream end can always be held constant. Therefore, these side belts 67 and 67 aligned on both sides can always convey packageable individual contents 46 to the reciprocating sealing bar 65 without fail.

As shown in FIG. 4, a pair of delivery belts 70 and 70 are respectively installed at the downstream end of the frame body 14, where delivery belts 70 and 70 integrally rotate themselves in conjunction with reciprocating movement of the frame body 14. Concretely, as shown in FIG. 3, a pair of pulleys 73 and 74 are rotatably installed to a frame unit 72 which is secured to the frame body 14 by means of a connecting member 71. A pair of endless belts 70 and 70 are respectively engaged with those pulleys 73 and 74. A drive gear 77 is engaged with a gear 75 which is set right above the pulley 73 via an idle gear 76. A shaft 78 is linked with a main shaft 79 which is installed across both-side frames via a pair of bevel gears 80 and 80. A chain wheel 81 secured to an end of the main shaft 79, a gear 82 immovably being secured to the frame 31 (shown in FIGS. 5 through 7) and linked with the drive pulley 38 provided for the side belts 67 and 67, and a drive chain wheel 83 immovably being secured to the frame 31, are respectively linked with each other by means of an endless chain 86 via a pair of idle wheels 84 and 85 secured to the frame body 14. When the endless chain 86 is rotated by the drive force of the drive chain wheel 83, those side belts 67 and 67 are rotated at a constant speed by the pulley 38 to cause those delivery belts 70 and 70 on both sides to simultaneously rotate themselves, and as a result, the tubular film 63 and packageable contents 46 nipped between these belts are jointly carried forward. A pair of idle wheels 84 and 85 secured to the frame body 14 integrally shift themselves in conjunction with the frame body 14. Since the speed of the rotation of the endless chain 86 driven by the drive chain wheel 83 is identical to the proceeding speed of the frame body 14, while the frame body 14 proceeds, relative speed of those delivery belts 70 and 70 against the movement of the frame body 14 is reduced to zero, and thus, relative speed between those delivery belts 70 and the tubular film 63 is also zero. In this case, as shown in FIGS. 1 and 2, even though vacuum absorptive force acts upon the interior of the tubular film 63 via a nozzle 87 inserted in the tubular film 63, since the packageable content at the foremost position is nipped by those delivery belts 70 and 70 aligned on both sides while being carried forward, the tubular film 63 can securely be prevented from being contracted by effect of vacuum absorptive force.

When the frame body 14 retreats to the upstream side of the tubular film 63, the delivery belts 70 and 70 rotate themselves at a speed corresponding to a sum of the speed of the rotation of the endless chain 86 and the retreating speed of the frame body 14 added thereto. Even when causing the frame body 14 to retreat itself while suspending the rotation of the endless chain 86, since the speed of the rotation of those delivery belts 70 and 70 is always proportional to the retreating speed of the frame body 14, the speed of the rotation of those delivery belts 70 and 70 for conveying the tubular film 63 during the retreating operation of the frame body 14 is exactly identical to the speed of conveying the tubular film 63 while the frame body 14 proceeds.

When the speed of the rotation of those side belts 67 and 67 for conveying packageable contents 46 during a halt of the frame body 14 is identical to the moving speed of the frame body 14 proceeding in the arrowed direction 34, distance between the packageable contents 46 and a pair of sealing bars 65 and 66 remains constant while the frame body 14 proceeds. Those delivery belts 70 and 70 at the downstream domain of the sealing mechanism integrally reciprocate themselves in conjunction with the sealing mechanism. Therefore, even when vacuum absorptive force acts upon the interior domain of the tubular film 63 nipped by the front and rear belts from both sides, the tubular film 63 is free from incurring unwanted contraction to enable packageable contents 46 to correctly maintain predetermined intervals therebetween, thus effectively preventing the sealing mechanism from incurring unwanted trouble otherwise caused by the contraction of the tubular film 63.

According to the mechanical structure shown in FIG. 3, a pair of delivery belts 70 and 70 installed to the down-stream domain of the frame body 14 is integrally driven by an endless chain 86 which drives a pair of side belts 67 and 67 installed to the upstream domain of the frame body 14. FIG. 8 schematically illustrates a varied embodiment of the invention representing that an endless chain 90 is introduced for linking a drive chain wheel 83 with a pair of side belts 67 and 67 installed to the upstream domain of a frame body 14. Substantially, the endless chain 90 is totally different from another endless chain 91 which transmits drive force to a pair of delivery belts 70 and 70 installed to the down-stream domain of the frame body 14. Concretely, the drive chain wheel 83 shown in FIG. 8 always rotates the endless chain 90 in the arrowed direction 92 and also rotates those side belts 67 and 67 aligned on both sides at a constant speed. Furthermore, rotating force of the endless chain 90 is transmitted to a wheel 94 which is secured to the frame body 14 via a shaft 93. Furthermore, rotating force of another wheel 95 secured to the shaft 93 is transmitted to an intermediate endless chain 96, an intermediate wheel 97, the endless chain 91, and a pair of delivery belts 70 and 70 via a pair of bevel gears 80 and 80. It should be understood however that, since this embodiment causes those endless chains 90 and 91 to rotate themselves in different directions, in order to rotate those delivery belts 70 and 70 in normal direction, it is essential that the direction of the engaged surfaces of a pair of bevel gears 80 and 80 be varied as required.

What is claimed is:

1. A packaging apparatus for nipping and sealing a length of tubular-film (63) between packageable individual contents (46), comprising;

a frame body (14) mounted for reciprocation lengthwise of said tubular film (63) along a conveying track for conveying said tubular film (63) in the direction of its length to cover packageable individual contents (46) which are aligned in file at equal intervals;

a pair of sealing bars (65) and (66) which are respectively secured to said frame body (14) and seal said tubular film (63) between said packageable individual contents (46);

a pair of belts (70) which are respectively secured to a frame unit (72) by a pair of pulleys (73) and (74) secured to said frame body (14) downstream of said tubular film (63) on said frame body (14), wherein said belts (70) and (70) jointly nip said tubular film (63) and said packageable contents from both sides;

an idle shaft (79) which is secured to said frame unit (72) and rotated in the direction of conveying said tubular film (63) in order that drive force can be transmitted to said pulleys (73) and (74) by a group of gears; and a means for transmitting drive force to said idle shaft (79) in order that the speed of rotation of said belts (70) and (70) can be reduced to zero relative to the movement of said frame body (14) while said frame body (14) proceeds in the direction of conveying said tubular film (63) and conversely said belts (70) and (70) can respectively maintain a speed of rotation identical to the proceeding speed of said frame body (14) while said frame body (14) retreats.

2. A packaging apparatus as defined in claim 1, further comprising;

a pair of movable pulleys (29) which are respectively secured to a bracket (28) connected to said frame body (14) downstream of said tubular film (63) across a clearance corresponding to the width of said packageable individual contents (46);

a pair of guide bars (30) and (30) whose one-ends respectively are secured to said bracket (28) and the other open ends are further extended upstream of said tubular film (63);

a pair of tension rollers (37) rotatably secured to said pairs of guide bars (30) and (30);

two pairs of stationary pulleys (39) which are respectively disposed on both sides of and secured to a machine base (31) across a predetermined clearance corresponding to the width of packageable individual contents (46) at further upstream positions of said tubular film (63) beyond said tension rolls (37); and a pair of drive pulleys (38) which are respectively engaged with a pair of endless side belts (67) and (67) between said pair of movable pulleys (29) and (29) and said two pairs of stationary pulleys (39) in order to nip said packageable individual contents (46) and said tubular film (63) from both ends, wherein said drive pulleys (38) and (38) respectively cause slack regions of said side belts (67) and (67) to make a U-turn movement around said two pairs of stationary pulleys (39) and said pair of said tension rollers (37) to engage ends of slack regions of said side belts (67) and (67) with said machine base (31) adjacent said movable pulleys (29) and (29).

* * * * *